Nov. 13, 1962     J. F. FOUCH     3,064,068

BATTERY TERMINAL

Filed Oct. 23, 1959

INVENTOR.
JASPER F. FOUCH
BY ECKHOFF & SLICK
HIS ATTORNEYS

United States Patent Office 3,064,068
Patented Nov. 13, 1962

3,064,068
BATTERY TERMINAL
Jasper F. Fouch, La Canada, Calif., assignor to Stauffer Chemical Company, a corporation of Delaware
Filed Oct. 23, 1959, Ser. No. 848,446
1 Claim. (Cl. 136—168)

This invention relates to an improved battery box construction and particularly to an improved battery terminal.

In the so-called wet cell sulfuric acid electrolyte type of battery, the several plates are connected so that all the positive plates are connected to a positive terminal and the negative plates to a negative terminal. The terminals extend through the top or cover of the battery in which they are supported by a bushing embedded in the molded cover of the battery. The terminals are frequently subject to abuse by those attaching the wire connections leading from the terminals to the unit to which the battery is connected. Because of this leakage of electrolyte from the battery frequently occurs around the terminal posts with resulting corrosion of the terminal.

In use, it is, of course, essential that the positive and negative terminals be correctly connected, otherwise the direct current from the battery may be misapplied.

In accordance with the present invention, I provide a terminal construction in which leakage of the electrolyte from the battery is largely eliminated if it is not made absolutely impossible. Further, I provide an easy and ready identification of the positive and negative terminals. This eliminates the necessity of painting the tops of the terminal posts and makes the identification simpler and more positive.

It is in general the broad object of the present invention to provide an improved construction for a storage battery terminal.

Another object of the present invention is to provide a terminal construction in which the possible leakage of acid is substantially obviated if not entirely eliminated.

The invention includes other objects and features of advantage, some of which, together with the foregoing, will appear hereinafter wherein the present preferred form of terminal construction embodying this invention is disclosed.

Figure 1:
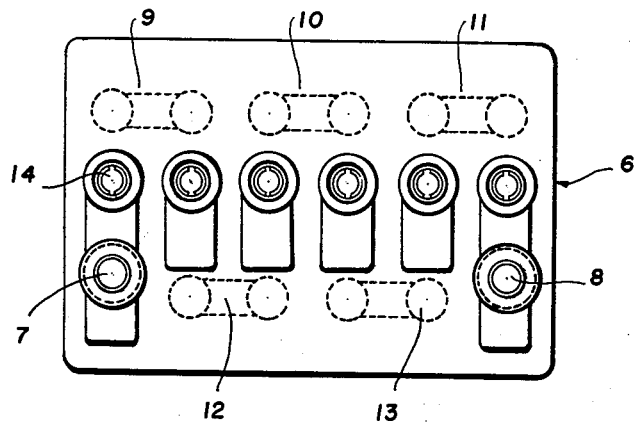
Figure 2:
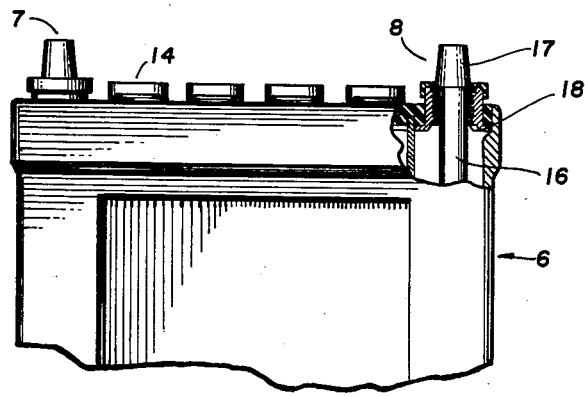

In the drawing accompanying and forming a part hereof, FIGURE 1 is a plan view of a battery embodying the present invention. FIGURE 2 is a side elevation thereof, partly broken away, to show the terminal construction in detail.

Figure 3:
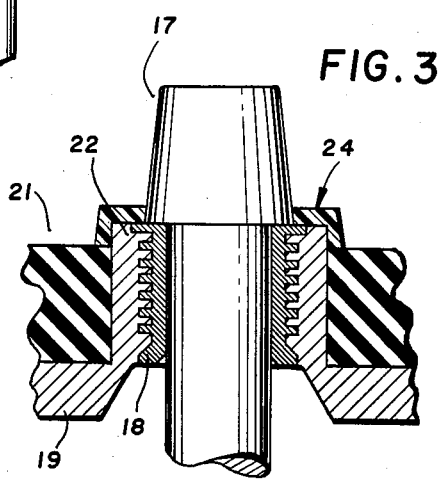
Figure 4:
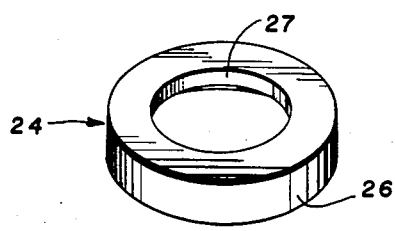

FIGURE 3 is a partial sectional view taken through a battery terminal, while FIGURE 4 is a perspective view illustrating an element used in accordance with the present invention.

Referring to FIGURE 1, I have shown a typical twelve-volt storage battery at 6, the positive and negative terminals being designated as 7 and 8. The battery includes six cells (not shown), the negative and positive plates in each cell being connected as by connectors 9 through 13. To permit of inspection of each cell, and the addition of electrolyte or distilled water as desired, typical inlet openings 14 are provided in each cell.

Referring particularly to FIGURES 2 and 3, each terminal includes an upstanding post 16 having a tapered end 17 providing a terminal exterior of the battery. As appears particularly in FIGURE 3, the terminal is sealed as by a lead bushing 18 embedded in the molded cover 19, the latter, in turn, being covered with a suitable sealing material 21.

In accordance with this invention, the cover material is molded about lead bushing 18 to provide an upstanding annular portion 22, which is only partially surrounded by the sealing material 21 to leave an upstanding and exposed terminal end, on which is fitted an annular ring, generally indicated at 24. The ring includes a depending shoulder 26, which fits over the end of the annular portion 22 in a snug relationship. Also, the inner edge 27 of the ring is tapered to fit snugly against the tapered sidewall of the terminal 17.

Due to the tight fit of the ring around the terminal post and against the cover material 21, as well as portion 22, creeping of acid around the post as may occur if a leak exists between the cover and the post is prevented. The ring is molded of a suitable plastic material, such as polyethylene. This has such resiliency that it grips the annular portion 22 and the terminal 17 in a tight fit.

In accordance with this invention, a ring is provided about each terminal 7 and 8, that provided about the positive terminal being colored red, while that provided about the negative terminal is colored green. Because of its resilient nature, the ring can be stamped with suitable identifying material, for example, to indicate the battery type, the number, the date of manufacture and sale. This is particularly desirable on usual twelve-volt submerged battery types where no raised surfaces are available on which to stamp such information.

I claim:

In a lead-plate sulfuric acid electrolyte storage battery, the improvements comprising:

(a) a molded plastic cover for said battery having a pair of tubular extensions integral therewith extending upwardly therefrom at either end of the said battery for receipt of lead bushings and terminal posts;

(b) a lead bushing molded concentrically within each of the said tubular extensions;

(c) a lead terminal mounted concentrically in each of the said bushings and extending into said battery and above said bushings to provide a terminal for an electrical connector;

(d) a sealing material covering the entirety of said molded plastic cover and extending to points just beneath the uppermost edges of said tubular extensions whereby to leave portions of the top and lateral services of said extensions exposed;

(e) and differently colored resilient annular polyethylene rings fitting snugly about each of said exposed terminals, said rings having annular skirts thereon fitting over the exposed lateral walls of said tubular extensions whereby, with said sealing material, the entirety of each of said tubular extensions is covered.

References Cited in the file of this patent

UNITED STATES PATENTS

| | | |
|---|---|---|
| 1,453,791 | Gossling | May 1, 1923 |
| 1,512,896 | Kraft | Oct. 21, 1924 |
| 1,680,038 | Dunzweiler | Aug. 7, 1928 |
| 1,714,077 | Clark | May 21, 1929 |
| 2,220,005 | Smith | Oct. 29, 1940 |
| 2,678,960 | Jensen | May 18, 1954 |

FOREIGN PATENTS

| | | |
|---|---|---|
| 337,721 | Italy | Mar. 12, 1936 |

OTHER REFERENCES

"Popular Mechanics," May 1948, page 201.